United States Patent
Roudier et al.

(10) Patent No.: US 6,199,873 B1
(45) Date of Patent: Mar. 13, 2001

(54) DEVICE FOR CENTERING AND GRIPPING, PARTICULARLY OF AUTOMOBILE BODYWORK PARTS

(75) Inventors: Fabrice Roudier, Juziers; Michel Morel, Ermont, both of (FR)

(73) Assignee: Genus Technologies, Chatillon (FR)

( * ) Notice: Subject to any disclaimer, the term of this patent is extended or adjusted under 35 U.S.C. 154(b) by 0 days.

(21) Appl. No.: 09/361,405

(22) Filed: Jul. 27, 1999

(30) Foreign Application Priority Data

Jul. 27, 1998 (FR) .................................................. 98 09549

(51) Int. Cl.$^7$ ...................................................... B23B 31/42
(52) U.S. Cl. .................... 279/141; 279/2.24; 279/133; 294/97
(58) Field of Search .................... 279/2.24, 133, 279/141; 294/97

(56) References Cited

U.S. PATENT DOCUMENTS

| | | |
|---|---|---|
| 1,947,957 | 2/1934 | Tillman . |
| 2,576,741 | * 11/1951 | Witek ................................... 279/141 |
| 2,890,053 | * 6/1959 | Walker ................................. 279/141 |
| 2,922,657 | 1/1960 | Garrison et al. . |
| 3,233,908 | * 2/1966 | Schwarzmayr et al. ............. 279/141 |
| 5,083,352 | * 1/1992 | Nakako ................................... 29/57 |
| 5,562,007 | * 10/1996 | Seymour ............................... 279/141 |

FOREIGN PATENT DOCUMENTS

| | | |
|---|---|---|
| 297 18 643 | 12/1997 | (DE) . |
| 2 733 930 | 11/1996 | (FR) . |
| 2 757 437 | 6/1998 | (FR) . |

\* cited by examiner

*Primary Examiner*—Steven C. Bishop
(74) *Attorney, Agent, or Firm*—Young & Thompson

(57) ABSTRACT

A device for centering and gripping, particularly for automotive bodywork parts, comprises a body (1) with an actuating means (2) and has centering means (13) and gripping means (11, 12). The centering means (13) and the gripping means (12) comprise in combination a centering member (13) containing at least one retractable gripping member (11 or 12).

11 Claims, 3 Drawing Sheets

DEVICE FOR CENTERING AND GRIPPING, PARTICULARLY OF AUTOMOBILE BODYWORK PARTS

BACKGROUND OF THE INVENTION

1. Field of the Invention

The invention relates to a device for centering and gripping, particularly for automobile bodywork parts, of the type comprising a body with an actuating means and having centering and gripping means.

2. Description of the Related Art

In this technical field, there is commonly used as actuating means a hydraulic jack, a pneumatic jack, an electric jack or a remote actuating means that can transmit force by means of a cable or another suitable flexible connection means.

There are known means for positioning and centering, adapted to be inserted in an opening for positioning a metal sheet of automobile bodywork or a piece for automobile construction.

There is also known means for gripping and holding comprising a gripping or holding arm, whose blocked position is substantially perpendicular to the axis of pressure of the actuating means.

SUMMARY OF THE INVENTION

The invention has its object to improve the known technique, by providing a new device for simple and economical production ensuring simultaneously the centering and the gripping of a metal sheet or a piece for automobile bodywork.

The invention has for its object a device for centering and gripping, particularly for automobile bodywork parts, of the type comprising a body containing an actuating means adapted to actuate in combination at least one retractable gripping means and a centering member containing each retractable gripping member within said centering member, each gripping member having an end forming a hook extending radially outwardly and downwardly, characterized in that the device comprises mechanical means for return movement, connecting said actuating means to the centering and gripping members, so as to move the actuating means and the centering gripping members in a direction opposite to displacement of the centering member.

According to another characteristic of the invention:
- the centering member has a conical upper engagement end, and an intermediate centering portion which is substantially cylindrical,
- the pivoting of each gripping member is controlled by an axle secured to the centering member,
- the axle secured to the centering member is movable relative to the body of the device,
- the axle secured to the centering member is moved with a movement opposite that of the actuating means,
- the device comprises self-blocking crampons,
- the self-blocking crampons pivot about axles secured to the body of the device,
- the self-blocking crampons coact with an intermediate floatingly mounted piece,
- a movement of the axle is opposite to that of the actuating means, by means of a connecting rod pivotally mounted on a control square,
- the control square is rotatably mounted on an axle secured to the body, and comprises an opening in which is positioned an axle indirectly connected to the actuating means.

The movement of the axle 10 is ensured, in a direction opposite to that of the actuating means 2, 3 by means of a connecting rod 9 mounted pivotably on a control square 8.

The control square 8 is rotatably mounted about an axle 8a secured to the body 1, and comprises an opening in which is positioned an axle 7b indirectly connected to the actuating means 2, 3.

BRIEF DESCRIPTION OF THE DRAWINGS

The invention will be better understood from the description which follows, given by way of non-limiting example, with reference to the accompanying drawings, in which.

DESCRIPTION OF THE PREFERRED EMBODIMENTS

Figure 1:
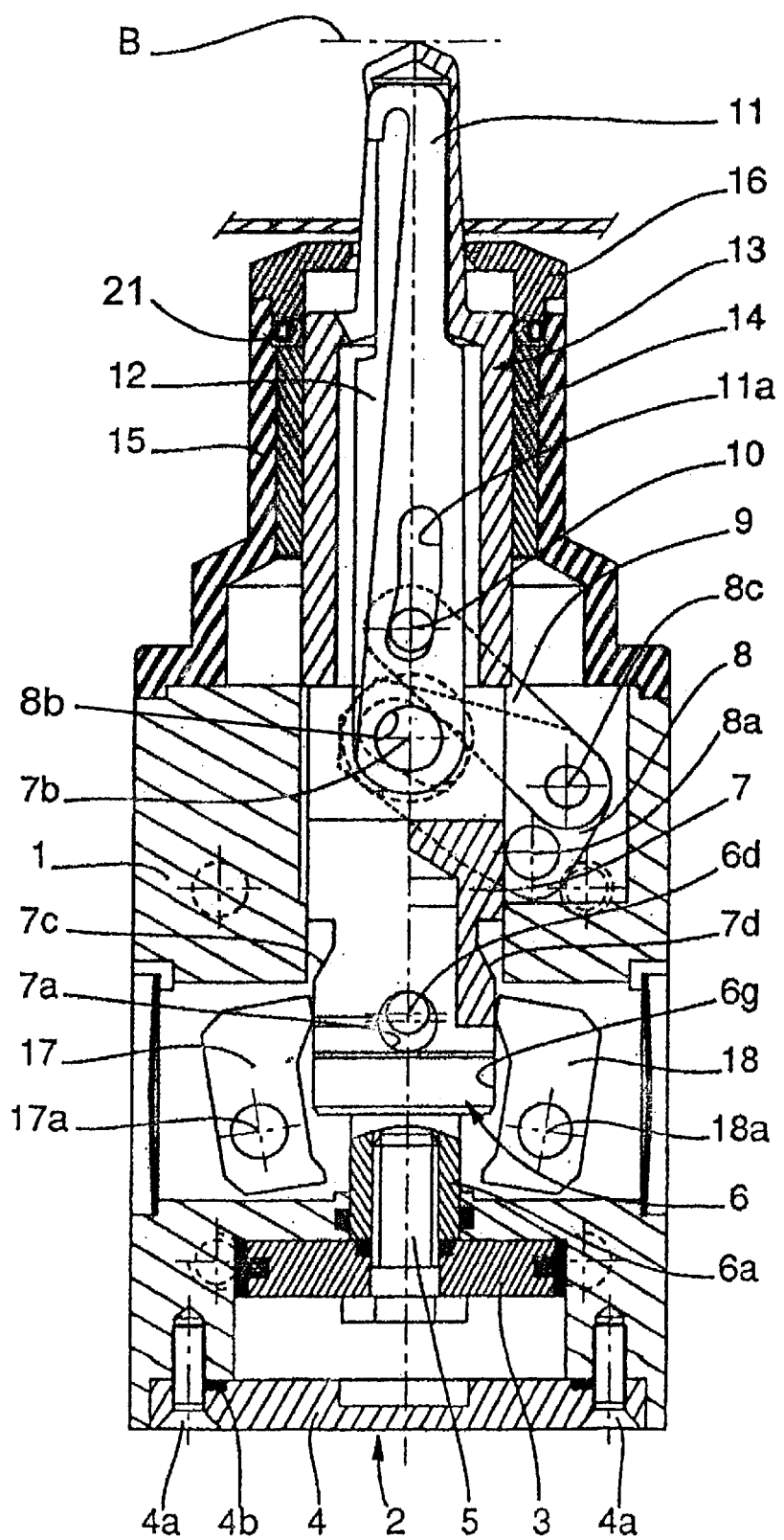
FIG. 1 is a schematic cross-sectional view in a medial plane of a device according to the invention in the centering position.
Figure 2:
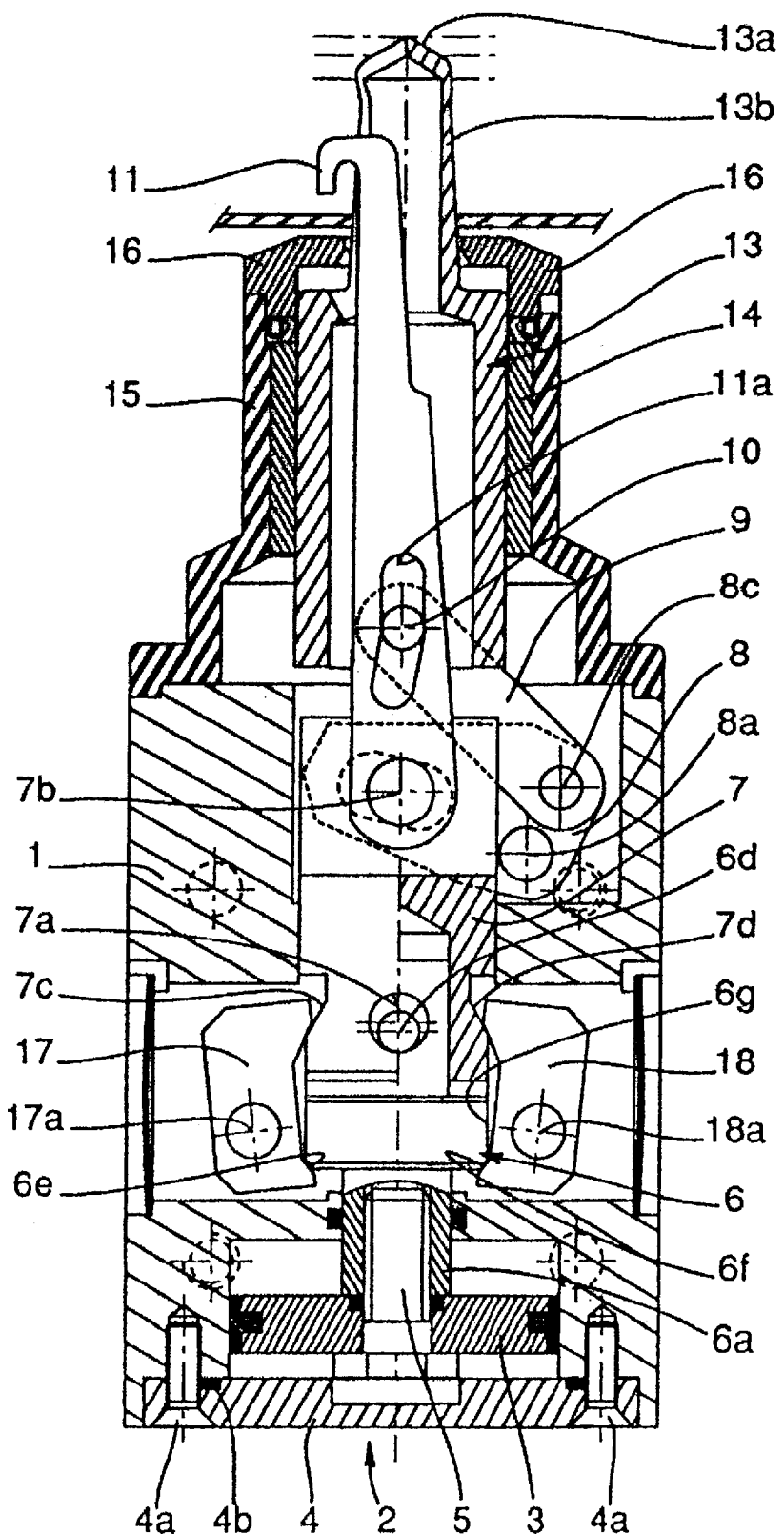
FIG. 2 shows schematically in cross-sectional view in a medial plane the device of FIG. 1 in the position at the beginning of gripping.
Figure 3:
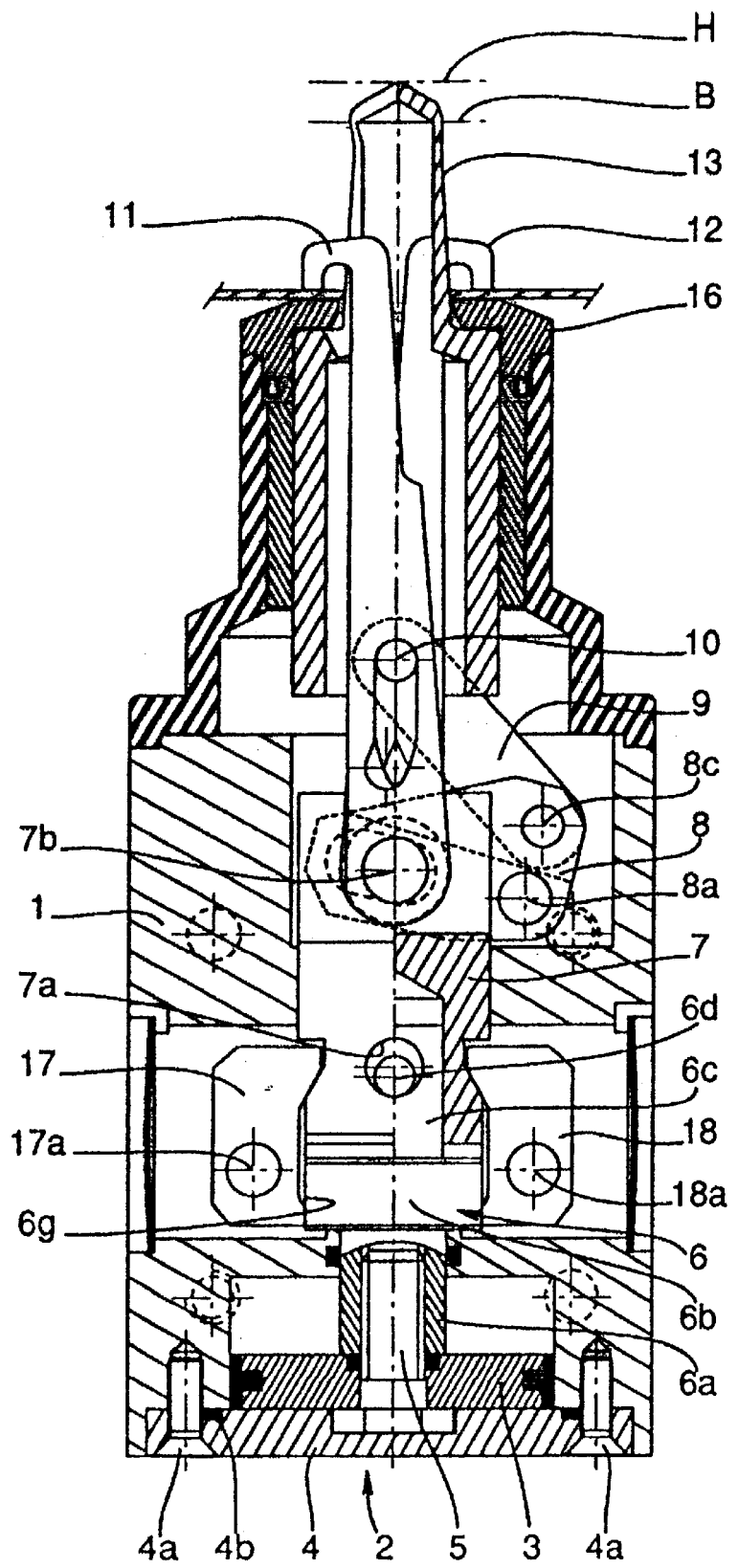
FIG. 3 shows schematically a cross-sectional view in a medial plane of a device according to FIGS. 1 and 2 in a position ensuring simultaneously centering and gripping.

With reference to FIGS. 1 to 3, identical or functionally equivalent elements are given identical reference numerals.

In FIG. 1, a device according to the invention has a body 1 machined in its lower portion to provide a jack 2 with a piston 3 and a closure cover 4 fixed by screws 4a with interposition of a suitable sealing joint 4b.

The piston 3 is connected by a screw 5 to an intermediate piece 6 having a rod 6a, an intermediate cylindrical portion 6b, and an upper portion 6c carrying an axle 6d. The piece 6 is mounted at least partially in a member 7 displaceable in translation and mounted floatingly because the bore 7a of the piece 7 has a diameter greater than the axle 6d of piece 6.

The piece 7 has an axle 7b which is positioned in an opening of a swingable member 8 rotatably mounted about an axle 8a secured to the body 1. The swinging piece 8 in the form of a square has a control opening 8b and an axle 8c on which is mounted pivotably a connecting rod 9. The connecting rod 9 has a control axle 10 which slides in an opening 11a which is curved or shaped like a broken line, of a gripping member 11. Preferably, the device comprises two gripping members 11 and 12 so as to ensure symmetrical gripping of a metal sheet or piece of bodywork.

The gripping members 11 and 12 are retractable in a centering member 13 having an upper cylindrical engagement end 13a and an intermediate portion 13b that is substantially cylindrical.

The gripping members 11, 12 contained in the centering members 13 are slidably mounted in a ring 14 mounted in an upper body 15 capped by a protective member 16 with the interposition of a scraping joint 21.

In the position of FIG. 1, the device is in the lower position B, in which there can be inserted a metal sheet from above the centering member 13. The grippers 11 and 12 are retracted within the centering member 13, because the axle 10 is disposed in the lower position and inclined from the control path 11a of the member 11, and 12a of the member 12. The axle 7b and the member 7 are in the upper position, because the piston 3 of the jack and the piece 6 which is directly connected to it, are located in the upper position. In this position, the axle 6d bears on the upper edge of the bore 7a of the piece 7.

In the position of FIG. 1, and the position of FIG. 2, compressed air is admitted into the upper chamber of the jack, so as to cause the movement of piston 3 downwardly. In the intermediate position of FIG. 2, the axle 6d and the piece 6 are moved downwardly until the position in which the axle 6d bears on the lower edge of the bore 7a and causes displacement of the piece 7 downwardly. The axle 7b causes swinging of the control square 8 by pulling on the latter in cooperation with the opening 8b. This swinging of the square 8 causes rising of the connecting rod 9, of the axle 10, and of the piece 13 to which the axle 10 is secured, as well as the outward movement of the members 11 and 12 because of the circulation of the axle 10 along the path 11a.

When the movement of the piston 3 downwardly is complete, the control square 8 has almost totally swung downward and the axle 10 of the connecting rod 9 is almost at the end of the path 11a, giving rise to the complete moving out, at the same time as the descent, of the gripping members 11 and 12 each having an end forming a hook extending radially externally and downwardly. At the same time, the member 13 on which is mounted the axle 10 has moved from its highest position H, this highest position H being higher than the low position B by a height comprised between 2 and 30 mm.

The metal sheet or piece of bodywork is accordingly gripped between the hooks of the members 11 and 12 which apply it to the protective member 16 and it is centered by the cylindrical portion of the centering member 13 which has moved from a height corresponding to the distance comprised between the heights B and H.

According to a preferred modification of the invention, there are provided self-blocking crampons 17, 18 articulated for rotation about axles 17a, 18a secured to the body 1. In the position of FIG. 1, the crampons 17, 18 are open and do not prevent movement of the pieces 6 and 7.

In the position of FIG. 2, the crampons 17, 18 begin to again grip by engaging in the ramps 7c, 7d provided in the piece 7, the movement of the crampons 17, 18 being controlled by chamfers 6e, 6f bearing on the lower edges of the crampons 17, 18.

In the position of FIG. 3, the crampons 17, 18 are locked in position along the ramps 7c, 7d (FIG. 2) because of the immobilization of the crampons maintained by the surfaces, for example flat, of their lower ends bearing on the cylindrical periphery 6g of the cylindrical portion 6b of the piece 6: in this position, even in case of a lack of compressed air or interruption of the control circuit, the crampons 17, 18, locked in the ramps 7c, 7d, prevent any unlocking of the device according to the invention.

In particular, the control square 8 could be replaced by another control member mounted for rotation on an axle spaced from the longitudinal axis of translation of the movable members of the device, namely the axis of symmetry of the piece 6.

What is claimed is:

1. Device for centering and gripping, particularly for automotive bodywork parts, of the type comprising a body (1) cntaining an actuating means (2) adapted to actuate in combination at least one retractable gripping member (11, 12) and a centering member (13) containing each griping member (11, 12) retractable into the interior of said centering member (13), each gripping member (11, 12) having an end forming a hook extending radially outwardly and downwardly, characterized in that the device comprises mechanical means (8) for return movement, connecting said actuating means (2) to the centering and gripping members (11, 12, 13) so as to displace the actuating means (2) and the gripping members (11, 12, 13) in a direction opposite to displacement of the centering member.

2. Device according to claim 1, characterized in that the centering member (13) has an upper conical engagement end and a substantially cylindrical intermediate centering portion (13b).

3. Device according to claim 1, characterized in that the pivoting of each gripping member (11 or 12) is controlled by an axle (10) secured to the centering member (13).

4. Device according to claim 3, characterized in that the axle (10) secured to the centering member (13) is movable relative to the body (1) of the device.

5. Device according to claim 4, characterized in that the axle (10) secured to the centering member (13) is displaced with a movement opposite that of the actuating means (2, 3).

6. Device according to claim 1, characterized in that the device comprises self-blocking crampons (17, 18).

7. Device according to claim 6, characterized in that the self-blocking crampons (17, 18) are pivotal about axles (17a, 18a) secured to the body (1) of the device.

8. Device according to claim 6, characterized in that the self-blocking crampons (17, 18) coact with a floatingly mounted intermediate member (7).

9. Device according to claim 3, characterized in that the displacement of the axle (10) is ensured according to a movement opposite that of the actuating means (2, 3) by means of a connecting rod (9) pivotally mounted on a control square (8).

10. Device according to claim 9, characterized in that the control square (8) is rotatable about an axle (8a) secured to the body (1) and comprises an opening in which is positioned an axle (7b) indirectly connected to the actuating means (2, 3).

11. Device according to claim 7, characterized in that the self-blocking crampons (17, 18) coact with a floatingly mounted intermediate member (7).

* * * * *